United States Patent
de la Haye et al.

(10) Patent No.: US 8,461,735 B2
(45) Date of Patent: Jun. 11, 2013

(54) MAGNETICALLY LEVITATED AND CONTROLLED BODY OF REVOLUTION

(75) Inventors: Ralf de la Haye, Bielefeld (DE);
Thomas Henke, Borgholzhausen (DE);
Andreas Levermann, Lage (DE);
Wolfgang Amrhein, Ottensheim (AT);
Siegfried Silber, Kirchschlag (AT);
Herbert Grabner, Linz (AT)

(73) Assignee: Hanning Elektro-Werke GmbH & Co. KG, Oerlinghausen (DE)

( * ) Notice: Subject to any disclaimer, the term of this patent is extended or adjusted under 35 U.S.C. 154(b) by 570 days.

(21) Appl. No.: 12/710,611

(22) Filed: Feb. 23, 2010

(65) Prior Publication Data

US 2010/0213777 A1   Aug. 26, 2010

(30) Foreign Application Priority Data

Feb. 23, 2009   (DE) .................. 10 2009 009 961

(51) Int. Cl.
*H02K 7/09*   (2006.01)
(52) U.S. Cl.
USPC ........................... 310/90.5; 310/67 R
(58) Field of Classification Search
USPC ............................. 310/90.5, 67 R
See application file for complete search history.

(56) References Cited

U.S. PATENT DOCUMENTS

| | | | | |
|---|---|---|---|---|
| 5,682,071 A | * | 10/1997 | Buhler et al. | 310/90.5 |
| 5,748,005 A | * | 5/1998 | McCormick et al. | 324/662 |
| 5,821,656 A | * | 10/1998 | Colby et al. | 310/90.5 |
| 5,872,409 A | * | 2/1999 | Jung | 310/68 B |
| 5,921,150 A | | 7/1999 | Romanauskas | |
| 5,994,803 A | * | 11/1999 | Jung | 310/51 |
| 6,879,074 B2 | * | 4/2005 | Amrhein et al. | 310/90.5 |
| 7,723,883 B2 | * | 5/2010 | Ozaki et al. | 310/90.5 |
| 7,825,558 B2 | * | 11/2010 | Jungmayr et al. | 310/90.5 |
| 2006/0055259 A1 | * | 3/2006 | Hanlon et al. | 310/90.5 |
| 2008/0074010 A1 | * | 3/2008 | Jungmayr et al. | 310/67 R |
| 2009/0131237 A1 | * | 5/2009 | Soetebier et al. | 494/46 |

FOREIGN PATENT DOCUMENTS

| | | |
|---|---|---|
| DE | 824231 B | 12/1951 |
| DE | 1132863 B | 7/1962 |
| DE | 1432827 A | 4/1969 |
| DE | 3008430 A1 | 9/1981 |
| DE | 2342767 C2 | 6/1983 |
| DE | 19853667 A1 | 5/2000 |
| DE | 102006018267 A1 | 11/2007 |
| DE | 102007036692 A1 | 3/2008 |
| DE | 102007022508 A1 | 11/2008 |
| WO | WO 2006111548 A1 * | 10/2006 |

* cited by examiner

*Primary Examiner* — Hanh Nguyen
*Assistant Examiner* — Naishadh Desai
(74) *Attorney, Agent, or Firm* — Patent Central LLC; Stephen A. Pendorf

(57) ABSTRACT

The invention relates to a body of revolution, in particular for a centrifugal, which comprises a rotator, an electric motor with a stator and a rotor wherein said latter is fixed to the rotator for rotational movement therewith, a support to which the stator of the electric motor is attached and a bearing unit for rotational arrangement of the rotor around an axis of rotation which comprises at least one bearing adapted to coact with an electromagnetic stabilizer unit in such a way that disturbing forces and/or disturbing vibrations of the rotator are counteracted and/or compensated.

30 Claims, 7 Drawing Sheets

MAGNETICALLY LEVITATED AND CONTROLLED BODY OF REVOLUTION

This present invention relates to a body of revolution having a rotator, an electric motor containing a stator and a rotor wherein said latter is fixed to the rotator for rotational movement therewith, a support to which the stator of the electric motor is attached and a bearing unit for the rotator to be arranged in for rotational movement around an axis of rotation.

Prior known from DE 28 33 893 A1 is a body of revolution that is rotationally arranged in two radial passive type magnetic bearings and one axial active type magnetic bearing. The magnetic bearing unit thus formed for rotational arrangement of a rotor in an electric motor driving said body of revolution is hence fitted with magnetic bearings only.

Publication DE 195 16 904 A1 discloses a body of revolution in the form of a laboratory centrifugal comprising a centrifugal rotator for taking samples or such like. To drive the centrifugal rotator there is an electric motor provided with a stator and a rotor in which a motor shaft is connected to a shaft end of the centrifugal rotator via a coupling. To improve the running performance of the centrifugal rotator and in particular to counteract undesirable unbalances under conditions of high speed thereof there is a bearing unit with bearing elements provided such that a shaft end of the centrifugal rotator is radially and flexibly held to a support that accommodates the electric motor. Also is the coupling flexible so that independent of the electric motor shaft the centrifugal rotator is enabled to rotate with an axial offset that conforms to an unbalance prevailing in each case. It is a drawback affecting the prior-art body of revolution that it is relatively bulky in axial direction.

It is an object of this present invention to improve a body of revolution in such a way that undesirable interferences such as unbalances may be reduced and/or compensated in an efficient way.

To achieve this goal the body of revolution of this present invention is characterized by the fact that the bearing unit comprises at least one bearing and that a stabilizer unit adapted for electric activation will act on the rotator in such a way that disturbing forces and/or disturbing vibrations of the rotator will be counteracted and/or reduced and/or relatively compensated in part.

The particular advantage of the invention resides in that by the electromagnetic stabilizer unit provided any undesirable vibrations of the system due to unbalances in the body of revolution or any other disturbing influences are effectively avoided and/or reduced. The electromagnetic stabilizer unit permits active and controlled action on the electric motor such that not only unbalance forces are reduced and/or compensated, but vibrations in the static part of the electric motor also are inhibited.

A preferred embodiment provides for the electromagnetic stabilizer unit to comprise a number of magnetic control elements which are distributed along the circumference of an axis of rotation, extend in at least one plane of action that is perpendicular to said axis of rotation and are adapted to be electrically activated in such a way that disturbing forces and/or disturbing vibrations are counteracted. Said magnetic control elements serve as corrective means to avoid undesirable vibrations of the electric motor due to unbalances in the body of revolution.

According to a modification this present invention comprises magnetic control elements in an axially offset arrangement relative to the bearing unit so that mechanical forces need to be entered in a parallel mode.

The bearing unit of a further modification has a mechanical bearing and/or an electromagnetic bearing and/or a fluid bearing. Preferably, a mechanical bearing will be combined with the electromagnetic stabilizer unit such that static and dynamic unbalances are counteracted with increased efficiency under conditions of nonuniform loading of the rotator.

Another modification of the invention provides for the stabilizer to be in the form of a piezoelectric unit wherein a piezoelement acts on the mechanical bearing and/or an elastic element of the motor by direct contact. It is by applying a radial force of given frequency for instance that the elastic element of the motor is caused to vibrate and thereby to generate a compensating force.

A further modification of the invention provides for a rotational element that is firmly connected to the rotator and the rotor is flexibly arranged by means of an elastic element. For instance may the rotational element be a shaft of the electric motor and may the elastic element be formed to a bearing element of the mechanical bearing such that an elastic suspension of the shaft ("soft bearing") will be ensured.

According to another modification of the invention are the stators of the electric motor on the one hand provided with a number of windings distributed over the circumference thereof and the magnetic control elements of the electromagnetic stabilizer unit on the other hand with windings that are interposed between those of the stator in circumferential direction with all of said windings disposed in one common radial plane. To save space the windings of the magnetic control elements may be preferably integrated in the electric motor. Alternatively, the windings of the magnetic control elements may be axially offset relative to the stator windings. This embodiment enables the magnetic control elements to be activated one by one and/or separate from the stator windings.

According to another modification of the invention there is a regulator/control unit provided that acts on the stator windings and/or the windings of the magnetic control elements and that dependent on sensor signals transfers an interference compensating signal to the windings of said magnetic control elements such that compensating forces are impressed to reduce the disturbing forces acting on the rotator. This affords the advantage that an active effect is imparted to the drive system and/or the magnetic bearing system in dependence of the actual loading of the rotator while at the same time reducing especially the static unbalance thereof.

A further modification of the invention provides for the stator windings to additionally serve as windings for the magnetic control elements and thus serve a dual function. The regulator/control unit applies such a voltage or current signal to the windings that on the one hand a predetermined motor torque and on the other hand a predetermined radial compensating force are generated to minimize any disturbing forces that may act on the rotator. Preferably in that case are the torque function and the interference compensating function generated by the same windings so that the mechanical structure may be simplified and the complexity of the mechanical makeup of the magnetic control elements (magnetic bearings) and the electric motor be reduced.

It is according to another modification of this invention that a force regulator module is integrated in the regulating/control unit to generate such a compensating signal sent to the windings of the magnetic control elements that disturbing forces acting on the rotator are substantially compensated. This means that virtually no forces are imparted to the rotator.

A further modification of the invention comprises a position regulator module integrated in the regulator/control unit which enables the magnetic control elements to be activated in such a way via a control signal that radial positioning forces are generated to make the rotator turn around the center of gravity along a predetermined trajectory. The rotator is operated in a position controlled mode in that case thus shifting its radial working point in such a way that its shaft rotates about the center of gravity independent of what speed may be involved. The advantage is that the rotator will be operating very quietly throughout the entire speed range and that there is no resonance in the critical speed range.

There is another modification of the invention proposed according to which the regulator/control unit comprises a rigidity module such that a rigidity parameter will so be changed in dependence of speed that the disturbing forces are reduced in a resonance speed range of the rotator. Advantageously, the overall rigidity of the electric motor bearing arrangement will be influenced in such a way that the electric motor is preferably started with a relatively high rigidity and changed over to a lower rigidity shortly before resonance speed is reached. This means that the resonance speed range will be virtually skipped. Alternatively, infinite rigidity setting also is possible.

A still further modification of the invention provides for the regulator/control unit to have a damping module for a damping parameter to be varied in such a way dependent on speed that damping in a resonance speed range of the rotator is reduced. This provision permits that damping can be reduced particularly in the resonance speed range so that undesirable unbalance forces, especially static unbalance forces, are counteracted.

According to another modification is the rotator of the body of revolution provided with a recess in which the mechanical bearing element and/or the magnetic bearing and/or a stator and/or a rotor of the electric motor is arranged at least partially. The invention hence provides a compact drive for a body of revolution.

Further advantages of the invention are as defined in the subclaims.

Exemplary embodiments of the invention will now be described in closer detail with reference to the accompanying drawings.

In these drawings:

FIG. 1 is an axial section through a body of revolution that is adapted to be driven by an internal rotor motor;

FIG. 2*a* is a schematic radial section through the internal rotor motor according to FIG. 1 which is operable by means of a regulator/control unit having a force regulator module;

FIG. 2*b* is a diagram showing bearing forces against time both without compensation (G1) and with exact compensation (G2) of unbalance forces;

Figure 9A:
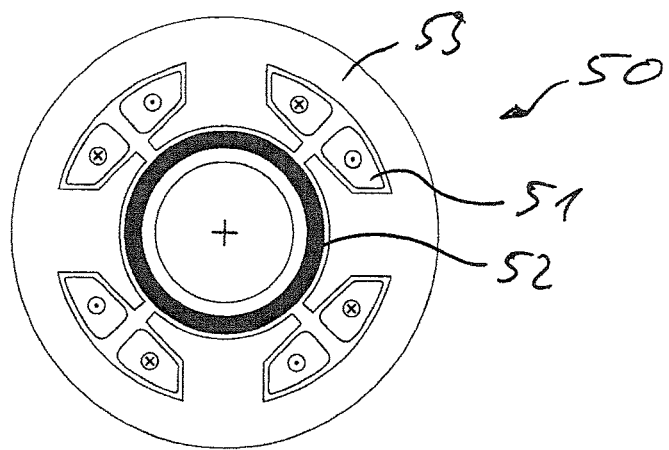
Figure 9B:
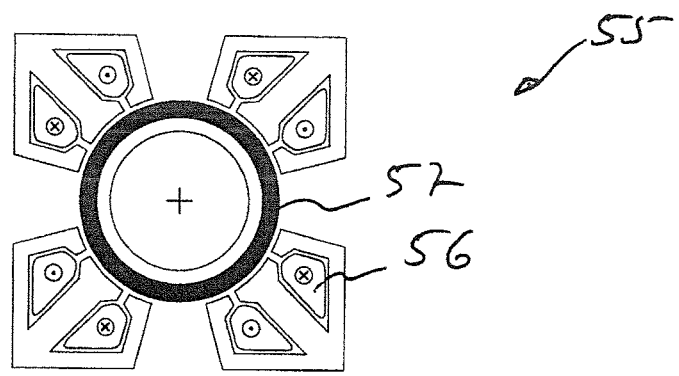
Figure 10:
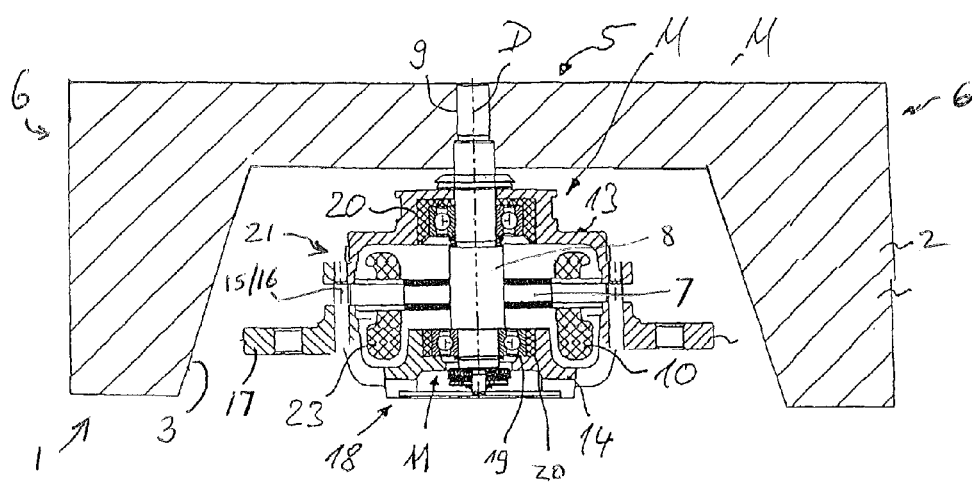

FIG. 9*a* is a schematic radial section through an electric motor of a further embodiment;

FIG. 9*b* is a schematic radial section through an electric motor of segmental design, and FIG. 10 is an axial section through a body of revolution that is adapted to be driven by a disk shaped internal rotor motor.

A body of revolution according to this present invention can be used in textile machines, stirrers, household appliances or for example in centrifugals and comprises a rotator which is rotationally driven by an electric motor at a predetermined speed.

According to one embodiment of the invention, the body of revolution is in the form of a laboratory centrifugal 1 for taking samples which comprises a centrifugal rotator 2 substantially of dynamically balanced design. Said centrifugal rotator 2 preferably arranged in upright position has on its underside 12 a truncated recess 3 in which at least part of an electric motor 4 is disposed. Said recess 3 is in a central area of the centrifugal rotator 2 which is forming a drive section 5 of the laboratory centrifugal 1. Not-shown receptacles for test samples are provided in a working section 6 of the centrifugal rotator 2 that adjoins the drive section 2 in a radially outward direction.

Figure 1:
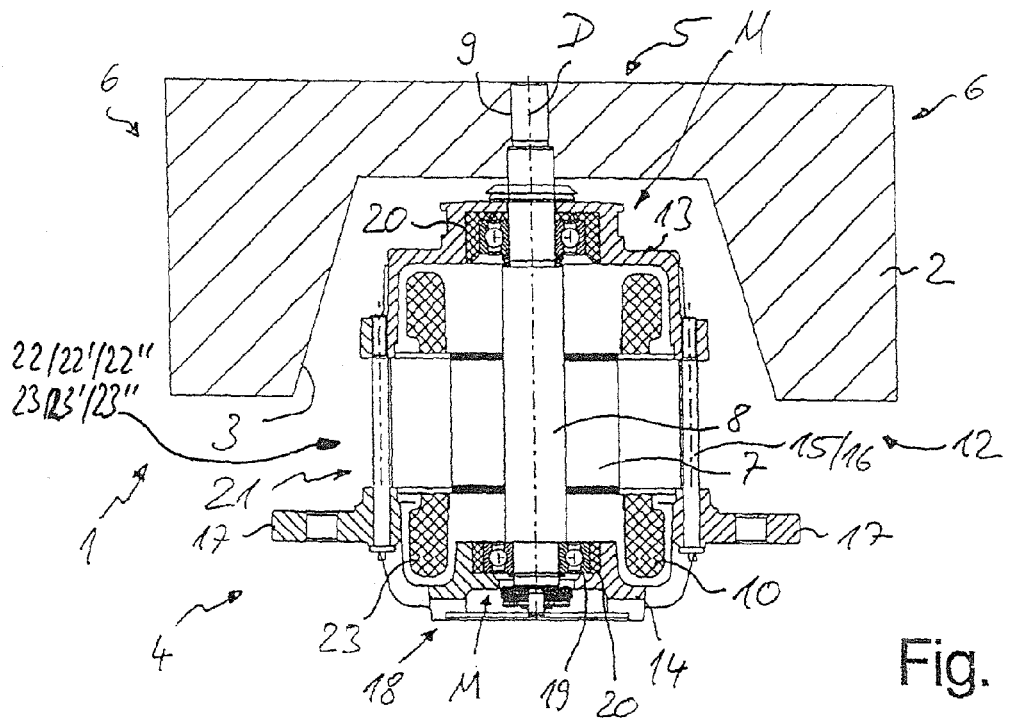

According to a first embodiment of the invention as per FIGS. 1 and 2 the electric motor 4 is an internal rotor motor wherein a permanent magnet type rotor 7 is firmly connected to a rotational element in the form of a shaft 8 which latter is disposed in a central bore 9 of the centrifugal rotator 2 and fixed to said rotator for rotational movement therewith. The synchronous type electric motor 4 has a stator 10 which while forming an air gap in a radially outward direction adjoins the rotor 7 by windings 23, 23', 23" that are circumferentially distributed around an axis of rotation D. The stator extends between a first bearing bracket (A bracket 13) proximal to the underside 12 of the centrifugal rotator 2 and a second bearing bracket (B bracket 14) distal from said underside 12 and is fixedly mounted by means of a cross-support 17 that protrudes transversally from a shell face 15 of the electric motor casing 16.

The axis of symmetry of shaft 8 is the axis of rotation D of the centrifugal rotator 2. Said axis of rotation D is at the same time the axis of symmetry of the centrifugal rotator 2.

For rotatable arrangement of the rotor 7 and/or the centrifugal rotator 2 a bearing unit 18 has a mechanical bearing M that as bearing elements both at the A bracket 13 and the B-bracket 14 comprises ball bearing elements 19 in which the shaft 8 is arranged and guided. Alternatively, the mechanical bearing element may be of friction bearing design also. An elastic element 20 (elastomer) is formed on a radially outer circumferential side of the ball bearing elements 19. Said elastic element 20 extends between the ball bearing elements 19 on one side and a radial section of the first bearing bracket 13 and/or of the second bearing bracket 14 on the other side and is flexible in radial direction such that an elastic "suspension" of the shaft 8 on bearing brackets 13, 14 is obtained.

A not-shown alternative embodiment provides for the shaft 8 itself to be elastic rather than the mechanical bearing elements 19, 20.

Figure 3:
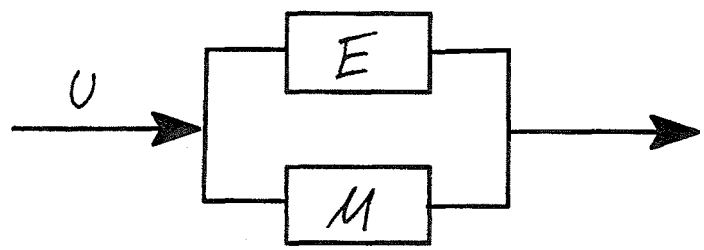
FIG. 3 is a schematic representation of different types of bearings in parallel arrangement.

Bearing unit 18 has an electromagnetic stabilizer unit E assigned to it which is integrated in the electric motor 4. As may be seen from FIGS. 1 and 3, the mechanical bearing M and the electromagnetic stabilizer unit E are offset in axial extension of the shaft 8. This implies that an unbalance force U is introduced parallelly such that a force splitup may be achieved other than in a case where electromagnetic stabilizer unit E and mechanical bearing M are shifted in radial direction (series connection).

According to a not-shown alternative embodiment of the invention it is possible to provide the bearing unit with an electromagnetic bearing and/or a fluid bearing and/or a piezoelectric bearing either in addition to or instead of the mechanical bearing M.

Figure 2A:
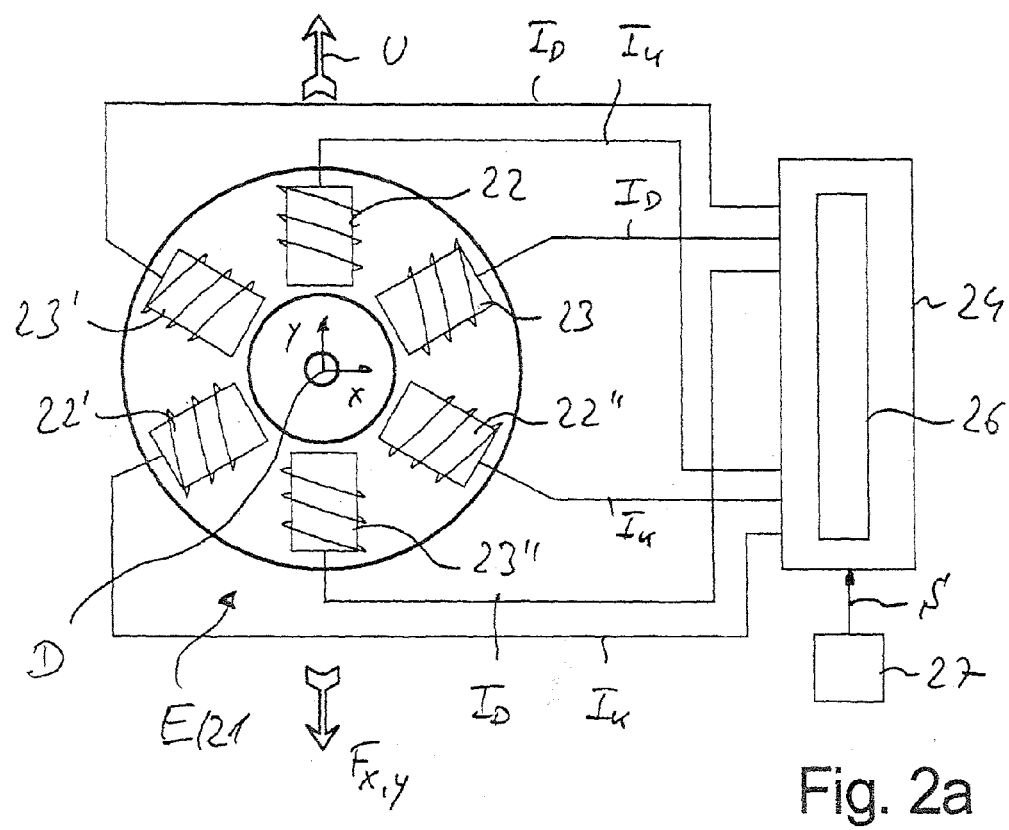

The electromagnetic stabilizer unit E comprises a magnetic bearing 21 that consists of a plurality of magnetic control elements 22, 22', 22" distributed in circumferential direction (FIG. 2a). Said magnetic control elements 22, 22', 22" are provided as current passed windings just like windings 23, 23', 23" of the stator 10 are. In this present exemplary embodiment the magnetic control elements 22, 22', 22" and the windings 23, 23', 23" are circumferentially arranged in alternating order. The magnetic control elements 22, 22', 22" are arranged at 120° relative offsets just like windings 23, 23', 23" are. The magnetic control elements 22, 22', 22" are preferably disposed at axial staggers relative to the windings 23, 23', 23" of stator 10.

Windings 22, 22', 22" and 23, 23', 23" have a regulator/control unit 24 assigned to them which is designed to activate the stator 10 on the one hand and the magnetic bearing 21 on the other hand. Said regulator/control unit 24 is in communication with a sensor unit 27 that may comprise acceleration sensors, path sensors etc. The sensor unit 27 may for instance comprise a Hall sensor to assess the actual speed of the motor 4 in each case.

The sensor unit 27 comprises sensors such that an unbalance force and/or unbalance moment U as for instance represented in FIG. 2 may be assessed. Such an unbalance force U is generated whenever the center of gravity is no longer on the geometrical axis of symmetry (axis of rotation) of the rotator (static unbalance). An unbalance force U may also arise when the axis of rotation D no longer coincides with any of the stable principal axes of inertia of the centrifugal rotator 2. The axis of rotation D may hence take a tilted center-of-gravity position (dynamic unbalance). Whenever an unbalance moment U is detected by the sensor unit 27 an appropriate sensor signal S will be transferred to the regulator/control unit 24.

Figure 2B:
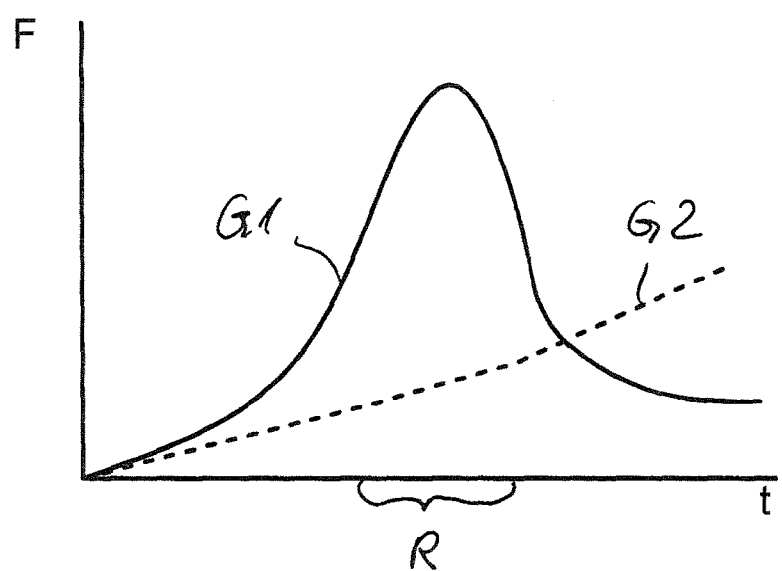
Figure 4:
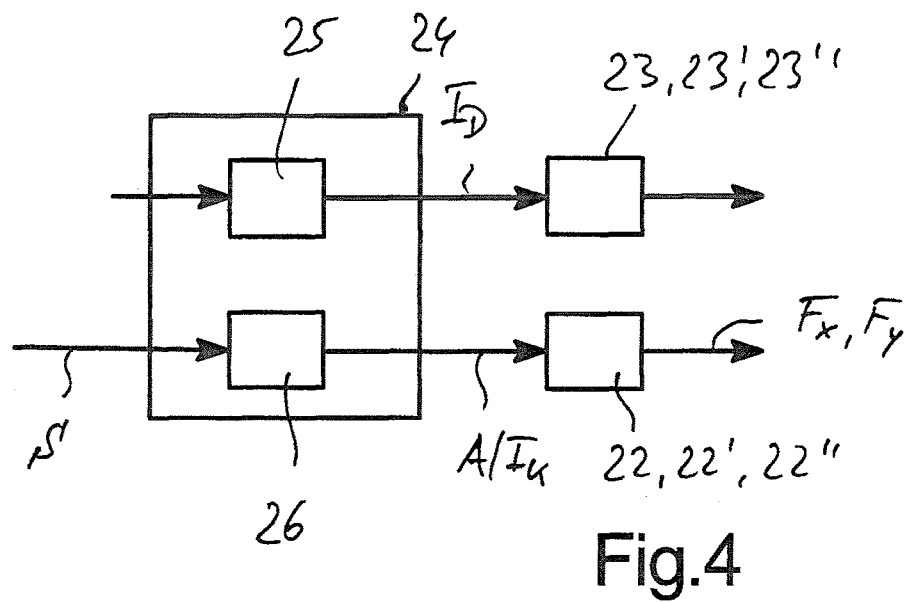
FIG. 4 is a schematic representation showing modes of activation of windings of the internal rotor motor.

This sensor signal S is dependent on a deflection x, y of the center of gravity of the centrifugal rotator 2 relative to the axis of rotation D as caused by unbalance vibration. As will be better seen from FIG. 4, the regulator/control unit 24 is provided with a force regulator module 26 adapted to produce an interference compensating signal A that is transferred to the windings 22, 22', 22" of the magnetic control elements 21. The interference compensating signal A may for instance form a current signal $I_K$ due to which radial balancing forces $F_x$, $F_y$ are generated that substantially compensate the interference forces U acting on the rotator 2. FIG. 2b shows a curve G1 that represents the conventional course of bearing forces. It will be seen that increased bearing forces are involved in a resonance speed range R. The use of a force regulator module 26 results in a curve G2 according to which the bearing forces steadily increase with speed. A resonance case may be avoided due to this compensation.

A speed function module 25 of the regulator/control unit 24 generates a control signal $I_D$ adapted to activate the motor with a predetermined speed.

Figure 7:
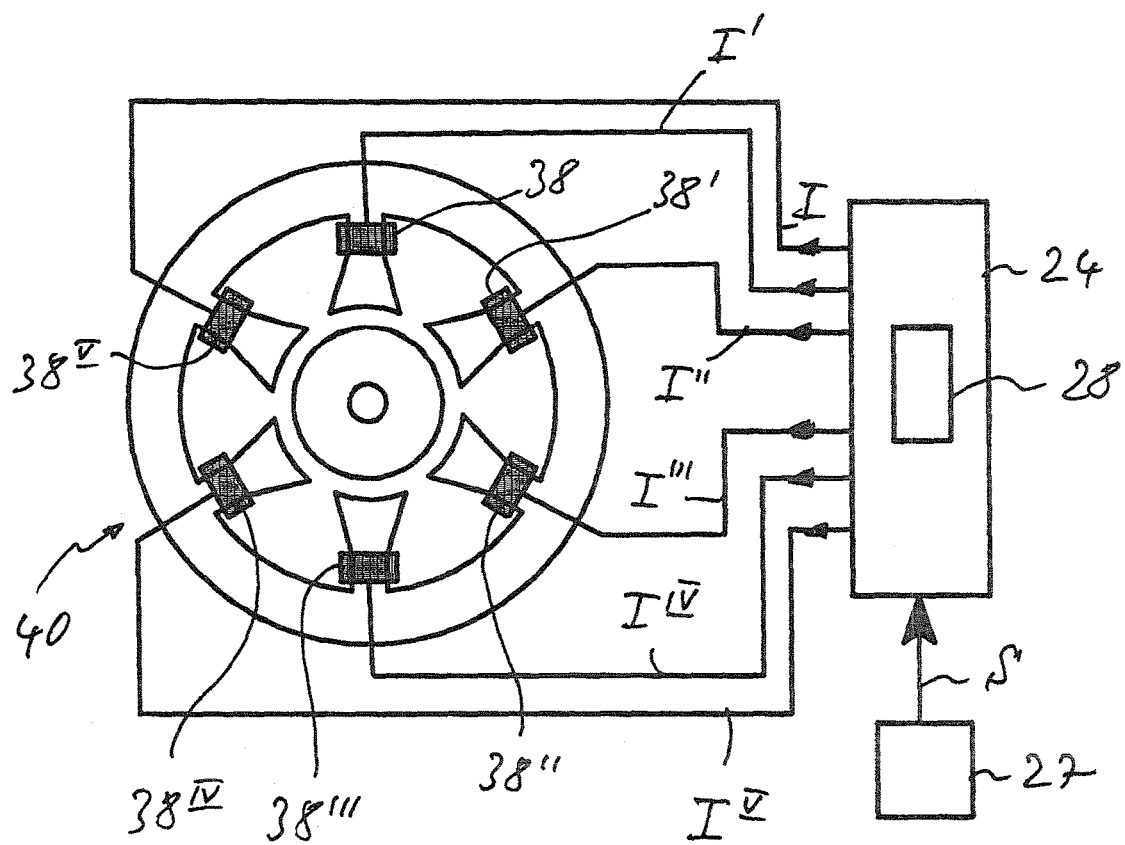
FIG. 7 is a schematic radial section through an internal rotor motor wherein the stator windings are at the same time constituting magnetic control elements and wherein the electric motor is adapted for activation via a regulator/control unit that comprises a position regulator module and/or force regulator module and/or rigidity module and/or damping module.

According to an alternate embodiment of the invention according to FIG. 7 it is possible to have magnetic control elements in the form of windings 38, 38', 38", 38''', $38^{IV}$, $38^V$ of a stator 40 to which a voltage or current signal I, I', I", I''', $I^{IV}$, $I^V$ is fed such that there are produced a predetermined motor torque on the one hand and interference compensating forces $F_x$, $F_y$ on the other. The adjusting current intensities $I_P$, $I_K$ assessed in the preceding exemplary embodiment are hence superimposed. There is no separate control module needed for the stator 10 and the magnetic control elements 21 in that case. The control signals I, I', I", I''', $I^{IV}$, $I^V$ for the windings 23, 23', 23" of stator 10 and the windings 22, 22', 22" of the magnetic control elements 21 are sort of superimposed "in software".

The regulator/control unit 24 may have a position regulator module 28 as an alternate of or in addition to the force regulator module 26 to activate the windings 22, 22', 22" of the magnetic control elements in such a way that these are caused to produce radial positioning forces $F_x$, $F_y$ so that the rotor 7 will be rotating around the center of gravity along a predetermined trajectory. The position regulator module may be fitted with a PI controller for instance to make the shaft rotate around the center of gravity independent of what speed may be involved. Rotor 7 is hence rotated around another working point in a position controlled mode. The advantage here is that no unbalance forces occur.

The embodiment according to FIG. 7 provides for the regulator/control unit 24 to have means for supplying currents to the windings of the stator 10 and those of the magnetic bearing 21 such that a predetermined motor torque can be set independent of whatever radial balancing force K may be desired. There is no separate control module needed for stator 10 and magnetic bearing 21 in that case. The control signals for the windings of the stator 10 and those of the magnetic bearing 21 are sort of superimposed "in software".

It is an advantage that the magnetic bearing 21 integrated in the electric motor 4, preferably together with the mechanical bearing element 19, permits to avoid undesirable vibrations of the electric motor with a compensation of the unbalance moment U involved. Any tumbling of the axis of rotation D and/or any undesired radial shifting of that axis D in a resonance case at static unbalance can hence be prevented.

Figure 5:
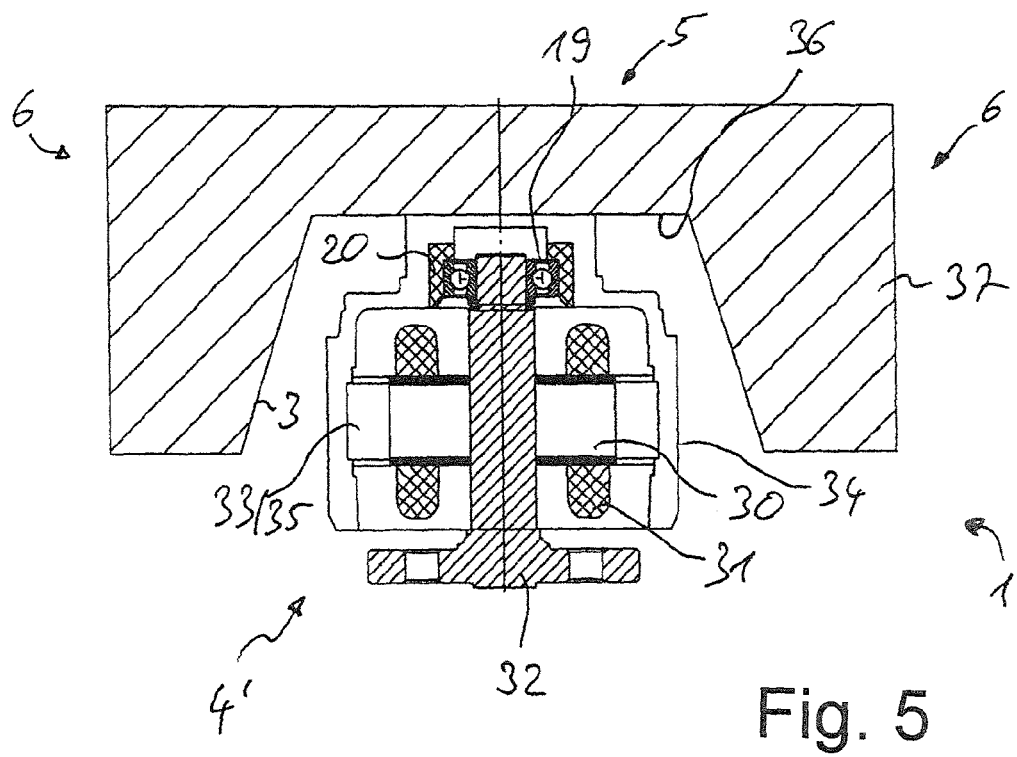
FIG. 5 is an axial section through a body of revolution according to a second embodiment of the invention that is adapted to be driven by an external rotor motor.

In a second embodiment of an electric motor 4' according to FIG. 5 same may be of external rotor design wherein a stator 30 with windings 31 is firmly attached to a base member 32. A permanent-magnetic rotor 33 has a bell-shaped casing 34 that is open on the side distal from the centrifugal rotator 2. The rotor 33 is provided with permanent magnets 35 which adjoin the windings 31 of the stator 30 in a radially outward direction with a gap therebetween. The casing 34 is firmly attached to the underside 36 of a centrifugal rotator 37. The casing 34 is seated on the stationary member 32 of the stator 30 on the side proximal to the rotator 37 by means of a mechanical bearing element 20 and a ball bearing element 19 same as described for the first exemplary embodiment.

Identical components in the exemplary embodiments are denoted by identical reference numerals/characters.

Other than described for the first exemplary embodiment is the electric motor 4' provided with just one mechanical bearing arrangement 19, 10 which is disposed within the recess 3 of the centrifugal rotator 37 and relatively close to the underside 36 thereof. The magnetic bearing 21 integrated in said electric motor 4' likewise extends substantially inside said recess 3. The magnetic bearing 21 is mounted in a radial plane that extends in a cross-sectional plane of the centrifugal rotator 2.

The regulator/control unit 24 acts on the magnetic control elements 22, 22', 22" in a way that such dynamic unbalances are counteracted at which the axis of rotation D of the centrifugal rotator 2, 37 undergoes a tumbling motion, and such static unbalances at which the axis of rotation D is not passing through the center of gravity of the rotator 2.

Magnetic bearing 21 is axially offset relative to the mechanical bearing 19, 20 in the exemplary embodiments under discussion. The mechanical strain on both bearings is in this case lower than in a version wherein the mechanical bearing 19, 20 on the one hand and the magnetic bearing 21 on the other hand are in a radial direction arranged side by side.

Figure 6:
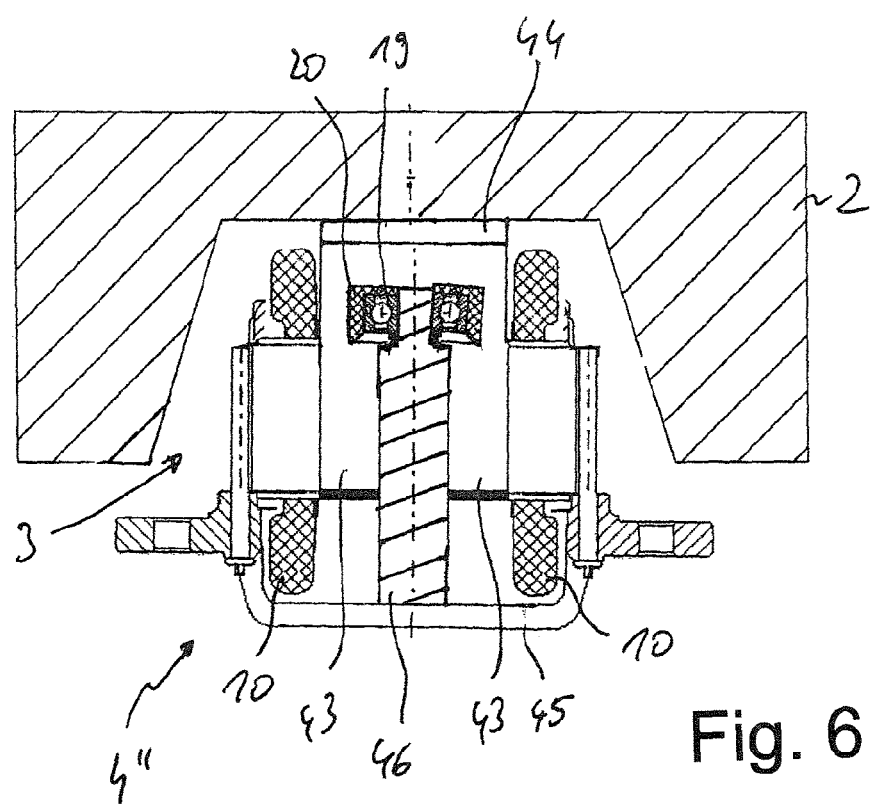
FIG. 6 is an axial section through a body of revolution according to a third embodiment of the invention which is adapted to be driven by an internal rotor motor wherein the rotor is firmly attached to a centrifugal rotator via a mounting plate.

A third embodiment of the invention according to FIG. 6 comprises an electric motor 4" of internal rotor design in which a rotor 43 is fixed to the underside 12 of the centrifugal rotator 2 with a mounting plate 44. The rotor 43 is supported by the mechanical bearing element 20 and the ball bearing element 19 on a stationary stud 46. Said stationary stud 46 extends coaxially with the axis of rotation D and is attached to a stationary support 45. It is an advantage of this embodiment that just one mechanical bearing 19, 20 is provided that may alternatively be arranged on an opposite side of rotor 43 also. Another advantage resides in that an A bearing bracket may be omitted such that the electric motor 4" and/or in particular the rotor 43 and the stator 10 may be positioned deeper in said recess 3. The electric motor 4" is hence open on the side proximal to the underside 12.

In a not-shown embodiment of the invention it is possible also to arrange the elastic element 20 with an axial offset relative to the mechanical bearing element 19.

The magnetic control elements 21 will be preferably arranged in a concentric relation to the at least one bearing of the bearing unit 18.

Figure 8:
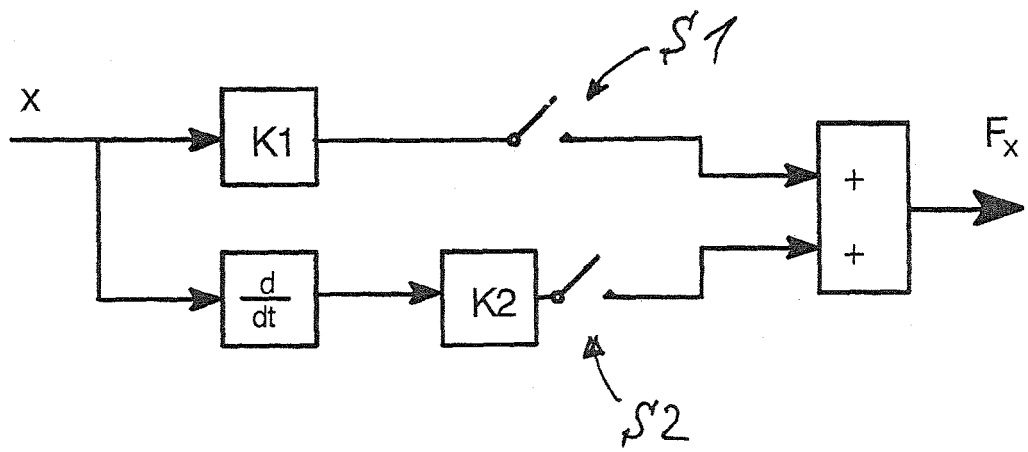
FIG. 8 is a block diagram of a rigidity module and a damping module of the regulator/control unit that represents for example an X component of a balancing force F.

A further embodiment of an electric actuating system for the magnetic control elements 21 as shown in FIG. 8 provides for the regulator/control unit 24 to include a rigidity module and/or a damping module that work to the principle represented in FIG. 8. Based on the movement equation below:

$$m^*x + (d-K_2)^*x + (c-K_1)^*x = 0$$

wherein:
m=mass/d=damping/c=rigidity
the rigidity module and the damping module may be connected separately via switching means S1 and/or S2. FIG. 8 shows for example the x component of a balancing force F. Corresponding activation takes place for the y component of said balancing force F. Bringing the switching means S1 into a closed position causes the rigidity parameter K1 to take effect which will be selected such that the radial deflection and/or the bearing forces are lower in a resonance speed range R of rotor 7 while when switching means S2 is brought into a closed position a damping parameter K2 takes effect which is set in such a way that the radial deflection and/or the bearing forces are reduced in the resonance speed range. Control signals $F_x$, $F_y$ activate the magnetic control elements 22, 22', 22". An advantage in that case is that bearing properties may be varied in a speed dependent mode either abruptly or continuously.

The control measures hereinbefore described (activation of magnetic control elements 21) may be combined also dependent on the type of application involved in every particular case.

As will be seen from FIG. 9a, an electric motor 50 may be provided in the form of an internal rotor unit with stator windings 51 and a permanent-excited rotor 52. The stator of said motor 50 is fitted with a magnetic backing ring 53 and closed along its circumference.

An alternate according to FIG. 9b may comprise an electric motor 55 of segmental design having stator coils 56 without magnetic coupling. Said motor 55 is of internal rotor type also which is provided with a permanent-excited rotor 57.

The windings of the coils 51 for this internal rotor motor 50 may be overlapped or not.

In an alternate embodiment the electric motor 4" may be of shallow, i.e. axially short disk-shaped design (disk rotor type motor) or a transverse flux machine. In that case, too, it may be arranged in said recess 2 to thereby reduce the overall height of the centrifugal 1 even further.

A still further alternative embodiment provides for the magnetically active rotor components, i.e. the permanent magnets of the motor, to be arranged inside the centrifugal rotator 2.

Another alternate embodiment of the invention (not shown) enables at least one magnetic control element to be arranged in a first plane of action that extends perpendicular to the axis of rotation D. At least one further magnetic control element is arranged in a second plane of action which is axially offset from and extends parallel to the first plane. The spacing between the first and the second plane of action is selected such that any breakdown torque produced due to dynamic unbalance can be reduced and/or compensated.

A further not-shown embodiment of the invention enables the magnetic control elements 21 to be optionally arranged outside the electric motor 4.

A still further embodiment of the invention is such that an interference compensating signal A may be assessed by detecting current and/or voltage signal changes of electric motor 4 and/or magnetic control elements 21. Inductivity variations due to twisting of rotor 7 and/or radial shifting thereof, for instance, may be detected and evaluated such that by processing said current and/or voltage signal changes a sensor signal S will be "reproduced". The use of an acceleration sensor, for instance, may be waived this way. Therefore, the magnetic control elements 21 have an additional sensor function. The advantage afforded by this solution resides in that the number of sensors may be reduced and/or minimized.

According to an embodiment of the invention as for instance shown in FIG. 7 an electric motor may comprise at least one magnetic control element that not only serves to generate a radial force compensating the interference forces, but also produces a peripheral force adapted to drive the rotator 2. The magnetic control elements have a dual function in that case, namely generating said compensating radial force and producing the motor torque. Concerned is a "no-bearing" electric motor that may additionally have a mechanical bearing 19 also the way as described in the foregoing.

| LIST OF REFERENCE NUMERALS/CHARACTERS | |
|---|---|
| No. | Designation |
| 1 | Laboratory Centrifugal |
| 2 | Centrifugal Rotator |
| 3 | Recess |
| 4, 4' | Electric Motor |
| 5 | Drive Section |
| 6 | Working Section |
| 7 | Rotor |
| 8 | Shaft |
| 9 | Central Bore |
| 10 | Stator |
| 11 | |
| 12 | Underside |
| 13 | $1^{st}$ Bearing Bracket (A Bracket) |
| 14 | 2nd Bearing Bracket (B Bracket) |
| 15 | Shell Face |
| 16 | Casing |
| 17 | Cross Support |
| 18 | Bearing Unit |
| 19 | Ball Bearing Element |
| 20 | Mech. Bearing Element |
| 21 | Magnetic Bearing |

-continued

LIST OF REFERENCE NUMERALS/CHARACTERS

| No. | Designation |
|---|---|
| 22, 22', 22" | Magnetic Control Elements |
| 23, 23', 23" | Windings |
| 24 | Regulator/Control Unit |
| 25 | Speed Function Module |
| 26 | Force Regulator Module |
| 27 | Sensor Unit |
| 28 | Position Reg. Module |
| 30 | Stator |
| 31 | Windings |
| 32 | Base |
| 33 | Rotor |
| 34 | Casing |
| 35 | Permanent Magnets |
| 36 | Underside |
| 37 | Centrifugal Rotator |
| 38 | Windings |
| 40 | Stator |
| 43 | Rotor |
| 44 | Mounting Plate |
| 45 | Support |
| 46 | Stud |
| 50 | Electric Motor |
| 51 | Stator Windings |
| 52 | Rotor |
| 53 | Backing Ring |
| 55 | Electric Motor |
| 56 | Coils |
| 57 | Rotor |
| A | Interference Compensating Signal |
| D | Axis of Rotation |
| I | Current |
| K | Balancing Moment |
| S | Sensor Signal |
| U | Unbalance Force |
| E | Electromagnetic Stabilizer Unit |
| F | Compensating Forces |
| R | Resonance Speed Range |

The invention claimed is:

1. A body of revolution having a rotator, an electric motor containing a stator and a rotor wherein said latter is fixed to the rotator for rotational movement therewith, a support to which the stator of the electric motor is attached, and a bearing unit for the rotator to be arranged in for rotational movement around an axis of rotation, wherein the bearing unit (18) comprises at least one bearing (19) and wherein a stabilizer unit (E) adapted for electric activation acts on the rotor (7) in such a way that disturbing forces and/or disturbing vibrations of the rotator (2) are counteracted and/or reduced and/or relatively compensated in part,
wherein a rotational element (8) connected to the rotator (2) and the rotor (7) and extending inside the electric motor (4) is flexibly arranged by means of an elastic element (20) or of elastic design itself,
wherein the windings (22, 22', 22") of the magnetic control elements (21) and/or the windings (23, 23', 23", 31) of the stator (10, 30) are connected to a control/regulator unit (24), wherein said control/regulator unit (24) is in communication with a sensor unit (27) to detect disturbing influences, wherein dependent on at least one sensor signal (S) prevailing at its input side the regulator/control unit (24) transmits an interference compensating signal (A) to the windings (22, 22' 22") of the magnetic control elements (21) such that compensating forces ($F_x$, $F_y$) are imparted to the rotor (7) to reduce the disturbing forces (U) acting on the rotator (2), and
wherein the stabilizer unit (E) comprises at least one magnetic control element which is adapted for electric activation in such a way that one hand a radial balancing force ($F_x$, $F_y$) compensating the disturbing forces and on the other hand a peripheral force to generate a motor torque driving the rotator (2) are generated.

2. The body of revolution according to claim 1, wherein the stabilizer unit (E) comprises a plurality of magnetic control elements (21) which are distributed over the circumference of an axis of rotation (D), extend in at least one plane of action that is perpendicular to said axis of rotation and are adapted for electric activation in such a way that disturbing forces and/or disturbing vibrations (U) of the rotator (2) are counteracted and/or compensated.

3. The body of revolution according to claim 1, wherein at least one magnetic control element (21) is axially offset relative to the bearing unit (18).

4. The body of revolution according to claim 3, wherein a plurality of magnetic control elements (21) are concentric with at least one bearing (11) of bearing unit (18).

5. The body of revolution according to claim 1, wherein the bearing unit (18) comprises a mechanical bearing (19) and/or an electromagnetic bearing and/or a fluid bearing.

6. The body of revolution according to claim 5, wherein the mechanical bearing (M) comprises a mechanical bearing element (19) that extends in radial and/or axial direction.

7. The body of revolution according to claim 5, wherein the mechanical bearing element (19) is of ball bearing or friction bearing type and has the elastic element (20) attached to it on at least one side of its circumference.

8. The body of revolution according to claim 7, wherein the elastic element (20) is axially offset relative to the mechanical bearing element (19).

9. The body of revolution according to claim 1, wherein the stabilizer unit is of electromagnetic or piezoelectric type.

10. The body of revolution according to claim 1, wherein the rotational element (8) is a shaft of the electric motor (4).

11. The body of revolution according claim 1, wherein the stabilizer unit (E) is integrated in the electric motor (4) or axially offset relative thereto.

12. The body of revolution according to claim 1, wherein at least one magnetic control element is arranged in a first plane of action that is perpendicular to the axis of rotation (D) and at least one further magnetic control element in a parallel second plane of action that is axially offset relative to said first plane of action.

13. The body of revolution according to claim 1, wherein the stator (10, 30) comprises a plurality of windings (23, 23', 23", 31) that are distributed over the circumference thereof and wherein the magnetic control elements (21) have a plurality of windings (22, 22', 22") that are distributed over the circumference thereof and in circumferential direction each extend between the windings (23, 23', 23", 31) of the stator (10, 30).

14. The body of revolution according to claim 13, wherein the windings (22, 22', 22") of the magnetic control elements (21) are in circumferential and/or axial direction offset relative to the windings (23, 23', 23", 31) of the stator (10, 30).

15. The body of revolution according to claim 1, wherein the magnetic control elements (21) are formed by windings (38, 38', 38", 38''' 38$^{IV}$) of the stator 40 to which a voltage or current signal (I, I', I", I''', I$^{IV}$, I$^V$) is applied such that on the one hand a predetermined motor torque and on the other hand a radial compensating force ($F_x$, $F_y$) are generated to minimize the disturbing or interference forces acting on the rotator (2).

16. The body of revolution according to claim 1, wherein a force regulator module (26) is integrated in the regulator/control unit (24) so that the at least one magnetic control element (21) will be activated via an interference compensating signal (A) in such a way that radial interference compensating forces ($F_x$, $F_y$) substantially compensate the interference forces acting on the rotator (2).

17. The body of revolution according to claim 1, wherein a position regulator module (28) is integrated in the regulator/control unit (24) to activate said at least one magnetic control element (21) in such a way that radial positioning forces ($F_x$, $F_y$) are generated and that the axis of the rotor (7) rotates along a given trajectory and in particular around the center of gravity.

18. The body of revolution according to claim 1, wherein the regulator/control unit (24) is provided with a rigidity module to vary a rigidity parameter (K1) of said module in such a way dependent on speed that the at least one resonance frequency is tuned off to thereby reduce the interference forces (U) in a given speed range of the rotator (2).

19. The body of revolution according to claim 1, wherein the regulator/control unit (24) is provided with a damping module to vary a damping parameter (K2) thereof in such a way dependent on speed that the damping effect is increased in a given speed range of the rotator (2).

20. The body of revolution according to claim 1, wherein the sensor unit (27) comprises a plurality of acceleration sensors and/or speed sensors and/or path sensors.

21. The body of revolution according to claim 1, wherein the interference compensating signal (A) is generated in dependence of current and/or voltage signal changes of the electric motor (4) and/or the magnetic control elements (21) and wherein a sensor signal (S) is reproduced by processing said current and/or voltage variations.

22. The body of revolution according to claim 1, wherein the magnetic control elements (21) are arranged in a radial plane that extends in a cross-sectional plane of the rotator (2).

23. The body of revolution according to claim 1, wherein the at least one magnetic control element (21) is disposed inside or outside the electric motor (4).

24. The body of revolution according to claim 1, wherein the rotator (2) is of centrifugal type and has on an underside (36) proximal to the electric motor (4, 4') a recess (3) in which the mechanical bearing element (19) and/or the magnetic control element (21) and/or the stator (10, 30) and/or the rotor (7, 33) is mounted either wholly or in part.

25. The body of revolution according to claim 24, wherein said recess (3) is of such depth as to permit a disk-shaped electric motor to be completely fitted therein.

26. The body of revolution according to claim 1, wherein the electric motor is an internal rotor motor (4) or an external rotor motor (4').

27. The body of revolution according to claim 1 wherein the stator of an electric motor (50, 55) is closed along its circumference or segmented.

28. The body of revolution according to claim 1, wherein the rotor (43) of the electric motor is connected to the centrifugal rotator (2) for rotational movement therewith either direct or via a fixing element (44) and seated on a stationary support (45) via the mechanical bearing element (19).

29. The body of revolution according to claim 1, wherein the magnetically active rotor components of the motor are arranged inside the centrifugal rotator (2).

30. The use of a body of revolution according to claim 1 in a centrifugal or a household appliance or a stirrer or a textile machine.

* * * * *